United States Patent
Ghosh et al.

(10) Patent No.: US 7,230,912 B1
(45) Date of Patent: Jun. 12, 2007

(54) SAMPLING TO A NEXT HOP

(75) Inventors: Kaushik Ghosh, Sunnyvale, CA (US); Dennis Ferguson, Mountain View, CA (US); Rajiv Patel, Los Altos, CA (US); Scott Mackie, Santa Cruz, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 940 days.

(21) Appl. No.: 09/881,110

(22) Filed: Jun. 14, 2001

(51) Int. Cl.
*G06F 11/00* (2006.01)
*H04L 12/26* (2006.01)

(52) U.S. Cl. .................. 370/216; 370/242; 370/248; 370/250

(58) Field of Classification Search ........ 370/229–238, 370/389, 399, 400, 406, 408, 395.2, 241–252
See application file for complete search history.

(56) References Cited

U.S. PATENT DOCUMENTS

| | | | | |
|---|---|---|---|---|
| 5,661,727 A | * | 8/1997 | Kermani et al. ........... 370/445 |
| 5,884,036 A | * | 3/1999 | Haley ..................... 709/224 |
| 5,951,649 A | * | 9/1999 | Dobbins et al. ........... 709/238 |
| 6,275,492 B1 | * | 8/2001 | Zhang .................... 370/392 |
| 6,571,313 B1 | * | 5/2003 | Filippi et al. ............ 711/108 |
| 6,625,658 B1 | * | 9/2003 | Oguchi et al. ............ 709/238 |
| 6,625,773 B1 | * | 9/2003 | Boivie et al. ............ 714/749 |
| 6,646,989 B1 | * | 11/2003 | Khotimsky et al. ........ 370/238 |
| 6,658,481 B1 | * | 12/2003 | Basso et al. ............. 709/243 |
| 6,674,756 B1 | * | 1/2004 | Rao et al. ............ 370/395.21 |
| 6,711,172 B1 | * | 3/2004 | Li .......................... 370/401 |
| 6,721,899 B1 | * | 4/2004 | Narvaez-Guarnieri et al. . 714/4 |
| 6,785,273 B1 | * | 8/2004 | Verma .................... 370/389 |
| 6,791,980 B1 | * | 9/2004 | Li .......................... 370/390 |
| 7,031,320 B2 | * | 4/2006 | Choe .................. 370/395.31 |
| 7,035,202 B2 | * | 4/2006 | Callon ................... 370/216 |
| 2002/0080755 A1 | * | 6/2002 | Tasman et al. ............ 370/338 |

* cited by examiner

*Primary Examiner*—Chi Pham
*Assistant Examiner*—Tri H. Phan
(74) *Attorney, Agent, or Firm*—STraub and Pokotylo; John C. Pokotylo (57) ABSTRACT

Samples from an addressed data forwarding devices, such as a router, are forwarded to a specified next hop address and/or out a specified next hop interface. However, the sampling and/or next hop forwarding is suppressed if the specified next hop address is unstable or unresolved.

20 Claims, 8 Drawing Sheets

SAMPLING TO A NEXT HOP

§ 1. BACKGROUND OF THE INVENTION

§ 1.1 Field of the Invention

The present invention concerns sampling addressed data (referred to as "packets" in the specification without loss of generality). More specifically, the present invention concerns forwarding packet samples to a specified next hop.

§1.2 Description of Related Art

The description of art in this section is not, and should not be interpreted to be, an admission that such art is prior art to the present invention.

§ 1.2.1 Networks, Inter-Networks, and the Need for Sampling

Many networks are made up of interconnected nodes (referred to as "routers" in the specification below without loss of generality) for forwarding addressed data (referred to as "packets" in the specification below without loss of generality). The routers may be geographically distributed throughout a region and connected by links (e.g., optical fiber, copper cable, wireless transmission channels, etc.). In such a network, each router typically interfaces with (e.g., terminates) multiple input links and multiple output links. Packets traverse the network by being forwarded from router to router until they reach their destinations (as typically specified in so-called layer-3 addresses in the packet headers). Unlike switches, which establish a connection for the duration of a "call" or "session" to send data received on a given input port out on a given output port, routers determine the destination addresses of received (ingress) packets and, based on these destination addresses, determine, in each case, the appropriate output link on which to send them. The address of the next node (layer 2 address) is often referred to as a "next hop" address. The interface terminating the particular output link may be referred to as a "next hop" interface. Since, unlike switches, routers are not connection-based—packets having the same destination address may actually traverse different paths through the network.

Samples of the packets passing through a particular router, or a particular group of routers, may be generated for example, for use in traffic analysis, or for examination by a regulatory authority.

§ 1.2.2 Challenges to Gathering Data for Network Analysis

Forwarding devices, such as routers, may be equipped to sample packets, or at least header information in such packets, accepted and forwarded. Such samples may be forwarded to another device. To get the samples to the other device, the samples may be (i) provided with a particular (layer 3) destination address (not needed for point-to-point connections), (ii) provided with a particular "next hop" (layer 2) address, and/or (iii) sent out on a particular interface (or port) associated with the next hop (layer 2) address. Typically, the interface or port terminates a physical link. If the physical port or link goes down, samples may be lost. Further, in a typical router, a particular IP (layer 3) destination address will have an associated next hop (layer 2) destination address and an associated output interface. These associations may be determined by a routing protocol for example. Such routing protocols typically determine routes based on continuously updated network topology information. If this network topology information changes, the association of a particular IP (layer 3) address to a particular next hop (layer 2) destination address and output port may become unstable or unresolved. Thus, there is a possibility that samples may be sent, inadvertently, to the wrong place. If the sampling is done at line rate and the router handles relatively fast rates, it may be impractical to buffer such samples while the next hop is being resolved. Accordingly, there is a need to avoid sending samples to an improper address, or out an improper port.

§ 2. SUMMARY OF THE INVENTION

The present invention provides a method for avoiding sending samples to an improper address, or out an improper port. The present invention may do so by (a) determining a state of next hop information defining a destination for samples of addressed data (e.g., packets), (b) if it is determined that the state of the next hop information is stable, then generating samples from the addressed data and forwarding the samples based on the next hop information, and (c) if it is determined that the state of the next hop information is not stable, then not forwarding samples. The act of not forwarding samples may include dropping samples generated, and/or suppressing sample generation.

In one embodiment, the next hop information includes an index or name associated with an interface. A link terminated by the interface may define a point-to-point connection with a sample destination device.

In one embodiment, the state flag is stored in a hardware register.

The present invention may also provide apparatus for effecting such methods. Finally, the present invention may also provide data structures for storing information used and/or generated by the method.

§ 4. DETAILED DESCRIPTION

The present invention involves methods, apparatus, message formats and data structures to set up forwarding samples to a specified next hop address or interface and to suppress and/or drop such samples when the specific next hop address or interface is unstable (e.g., unresolved). The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus, message formats and data structures, and any other patentable subject matter.

In the following, an exemplary environment in which the present invention may operate is described in § 4.1. Then, functions that may be performed by the present invention are introduced in § 4.2. Then, exemplary operations, apparatus, methods, message formats and data structures that may be used to effect those functions are described in § 4.3. Thereafter, an example illustrating certain operations of the invention in the context of a particular embodiment, is described in § 4.4. Finally, some conclusions regarding the present invention are set forth in § 4.5.

§ 4.1 Environment in which the Present Invention May Operate

Figure 1:
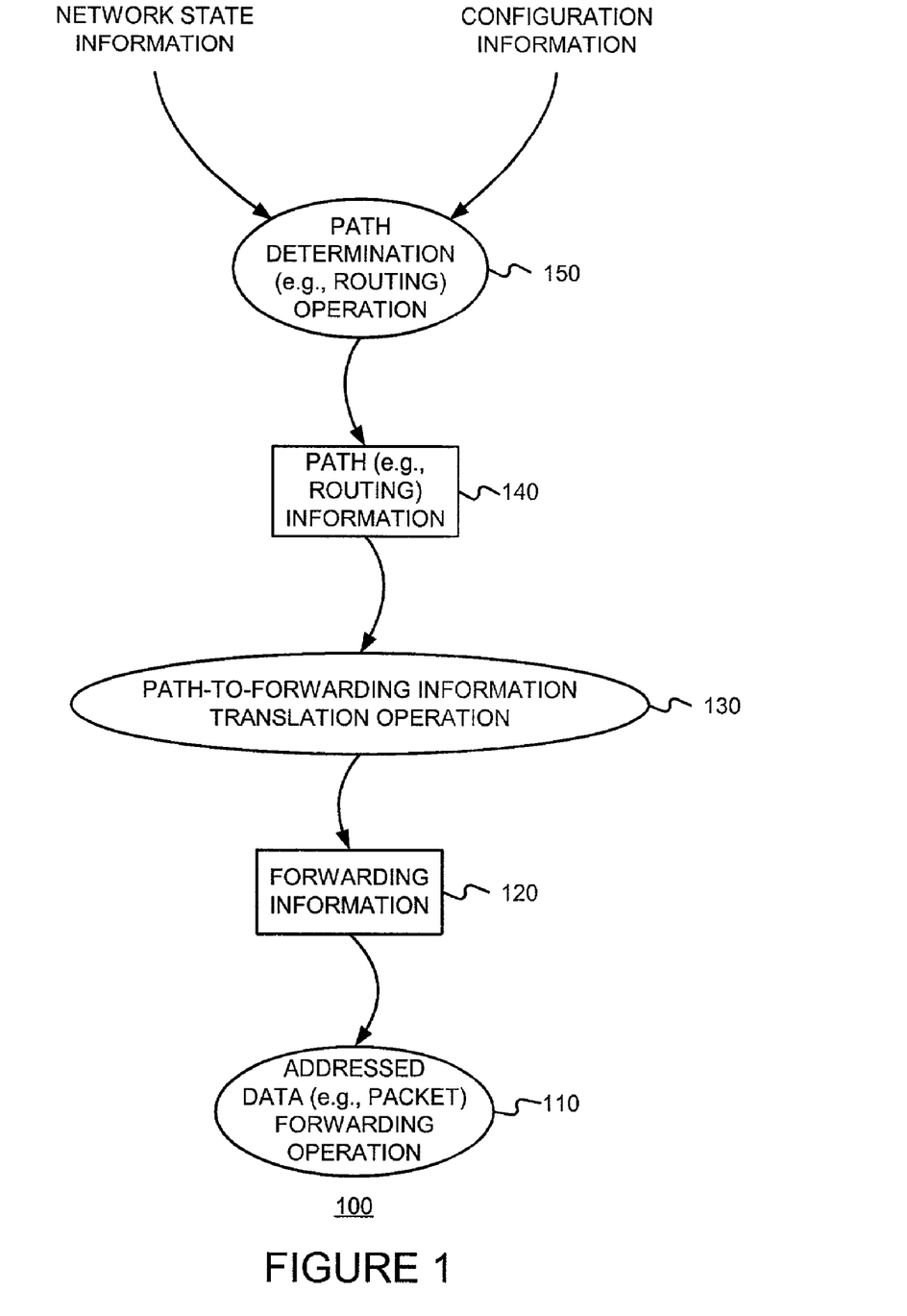
FIG. 1 is a bubble chart of operations performed by a network node, such as a router, in which the present invention may be used.

Various operations performed in accordance with the present invention may take place in a network node for forwarding addressed data, such as a router for example. FIG. 1 is a bubble chart of a addressed data forwarding device (e.g., a router) 100 in which the present invention may operate. As shown, an addressed data (e.g., packet) forwarding operation 110 forwards packets towards their ultimate destination based on information in (e.g., the headers of) the packets, as well as forwarding information 120. Typically, the forwarding information maps a destination IP (layer 3) address in a particular header to a next hop (layer 2) address. The forwarding information 120 may be created and managed by a path-to-forwarding information translation operation 130 based on path (e.g., routing) information 140. The path (e.g., routing) information 140 is determined by a path determination (e.g., routing) operation 150 based on network state information (e.g., from a traffic engineering database, or a link state database) and/or configuration information. The path determination (e.g., routing) operation 150 may use known routing protocols.

§ 4.2 Functions that May be Performed by the Present Invention

The present invention may function to (i) take samples of data being forwarded by an addressed data forwarding device, such as a router, (ii) forward the samples to a specified next hop address and/or out a specified next hop interface, and (iii) suppress the sampling and/or next hop forwarding if the specified next hop address is unstable or unresolved. These functions should be performed at fast rates, such as at line rate for a relatively fast interface (e.g., 10 Gbit/s in an OC-192 connection).

§ 4.3 Exemplary Operations, Architecture, Methods and Data Structures

In the following, operations that may be performed by the present invention are introduced in § 4.3.1 below. Then, apparatus, methods, message formats and data structures that may be used to effect those operations are described in § 4.3.2.

§ 4.3.1 Operations

Figure 2:
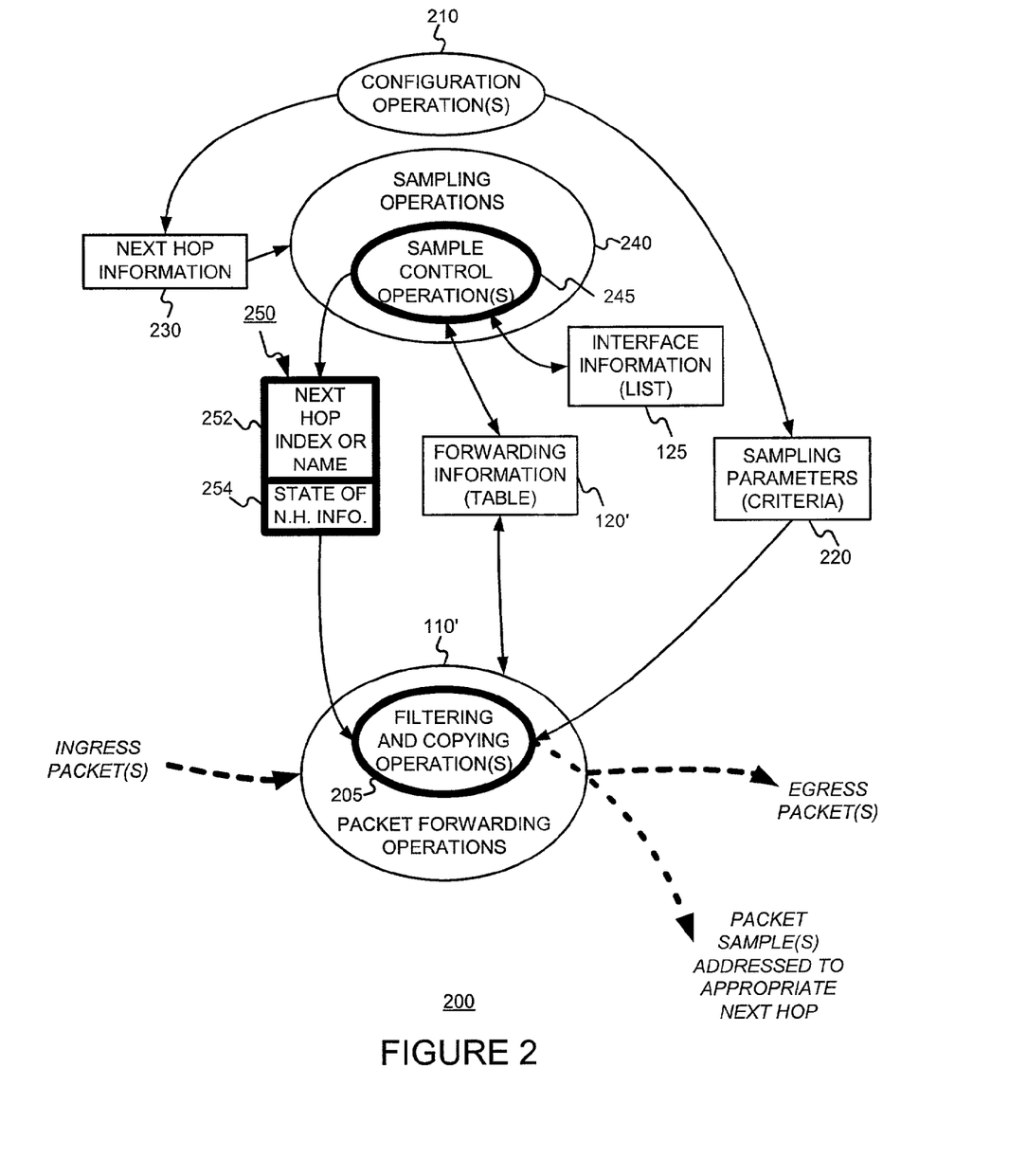
FIG. 2 is a bubble chart of operations that may be performed in accordance with the present invention.

FIG. 2 is a bubble chart of operations that may be performed in a node 200 in accordance with the present invention. Operations and data structures most relevant to the present invention are depicted with heavy line weights. Packet forwarding operations 110' may be used to forward ingress packets based on information from the packets, as well as forwarding information 120'. A filtering and copying operation(s) 205 may be used to forward copies of at least some of the packets being forwarded as samples. The filtering and copying operation(s) 205 may operate based on sampling parameters 220 and next hop information 250.

Configuration operation(s) 210 may be used to enter sampling parameters 220 to be used by filtering and copying operation(s) 205. These parameters may include, for example, a sampling rate, a run length, a maximum number of packets per unit time, and/or particular groups of packets to sample (e.g., sample class, sample protocol, etc.). Configuration operations 210 may also be used to enter next hop information 230 for defining a next hop address to which, and/or a next hop interface through which, packet samples are to be sent. If there is a single link or tunnel between the node 200 and the ultimate destination of the samples, the next hop information 230 requires no more than a point-to-point next hop interface. Otherwise, the (e.g., IP) address of the ultimate destination of the samples should be included in the next hop information 230. Encapsulation may be used to preserve the (layer 2 and 3) destination address(es) of the sampled packets.

Sampling operations 240 may include sample control operation(s) 245 for generating the next hop information 250 to be used by the filtering and copying operation(s) 205. The sample control operation(s) 245 may generate the next hop information 250 based on interface information 125, forwarding information 120', and configured next hop information 230. The next hop information 250 may include a next hop (interface) index 252 and a state (e.g., stable or unstable) 254 of the next hop interface. Although not shown, the next hop information 250 may also include a destination mask, which can be determined from the next hop (interface) index 252 and which defines a physical card slot associated with the logical interface. To enable the filtering and copying operation(s) 205 to occur at high speeds, in one embodiment, the next hop information 250 may be stored in one or more hardware registers.

Figure 3:
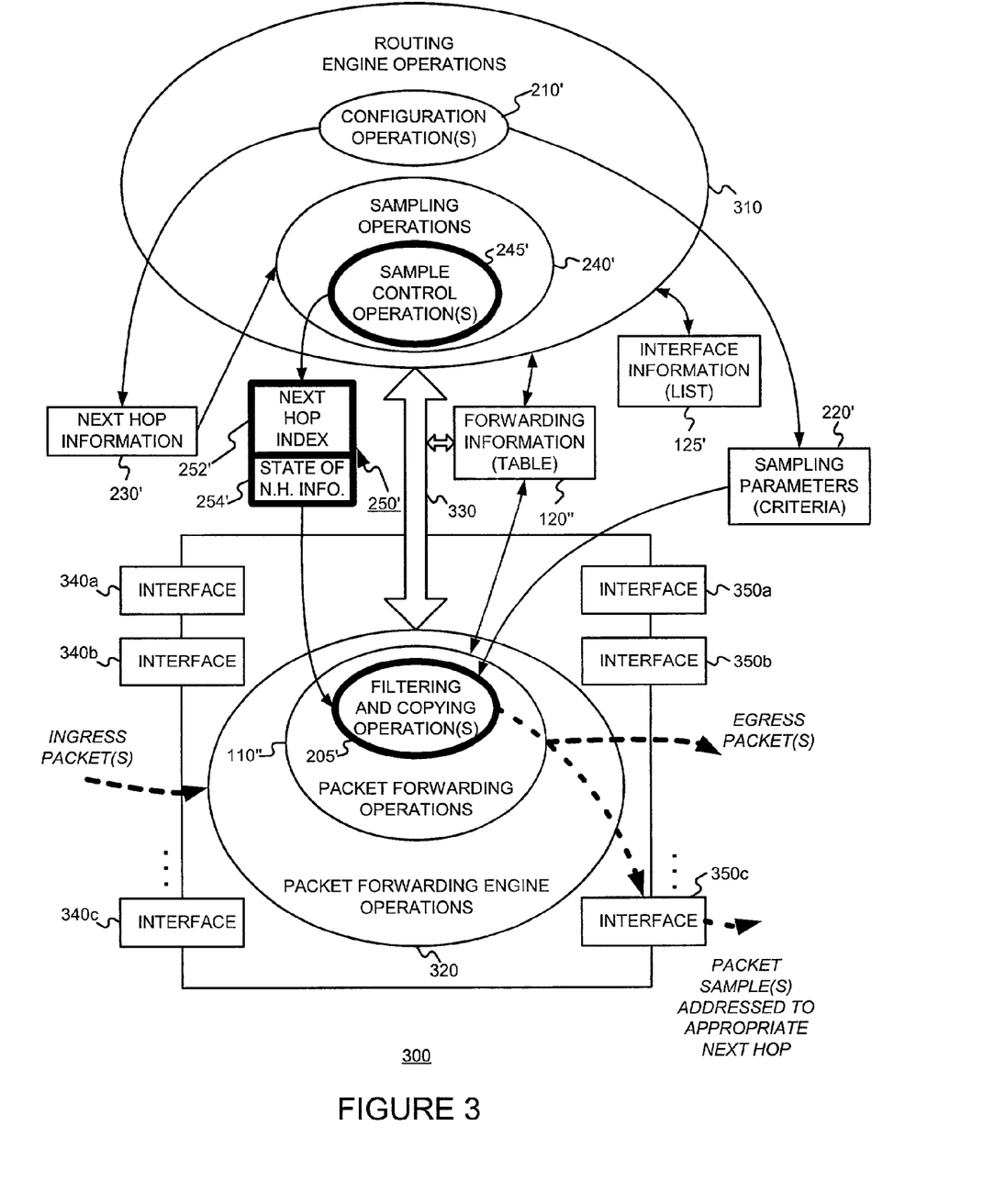
FIG. 3 is bubble chart of operations that may be performed in accordance with the present invention in a network node.

FIG. 3 is bubble chart of operations that may be performed in accordance with the present invention in a router 300 having a routing engine part and a packet forwarding engine part. As was the case with FIG. 2, operations and data structures most relevant to the present invention are depicted with heavy line weights. The router 300 of FIG. 3 is similar to the node 200 of FIG. 2, but specifies that the configuration operations 210' and sampling operations 240' are part of routing engine operations 310, and that the packet forwarding operations 110" are part of packet forwarding engine operations 320. Also shown are interfaces 340 through which ingress packets pass, as well as interfaces 350 through which egress packets pass. As further indicated in FIG. 3, the routing engine operations 310 and the packet forwarding engine operations 320 may communicate with each other via a network (e.g., a LAN such as an Ethernet LAN) or bus 330, and may share (e.g., instances of) the forwarding information 120".

Referring to both FIGS. 2 and 3, to reiterate, the operations most relevant to the present invention are the sample control operation(s) 245/245' and the filtering and copying operation(s) 205/205'. Next hop information 250/250' is passed from the sample control operation(s) 245/245' to the filtering and copying operations 205/205' (e.g., by writing to and reading from a storage device, such as one or more hardware registers for example).

§ 4.3.2 Exemplary Embodiment(s)

Exemplary methods that may be used to effect these operations, as well as exemplary data structures that may be used, or created, by these operations, are described in § 4.3.2.1 below. Then, systems on which these operations may be effected are described in § 4.3.2.2 below.

§ 4.3.2.1 Exemplary Methods and Data Structures

Figure 4:
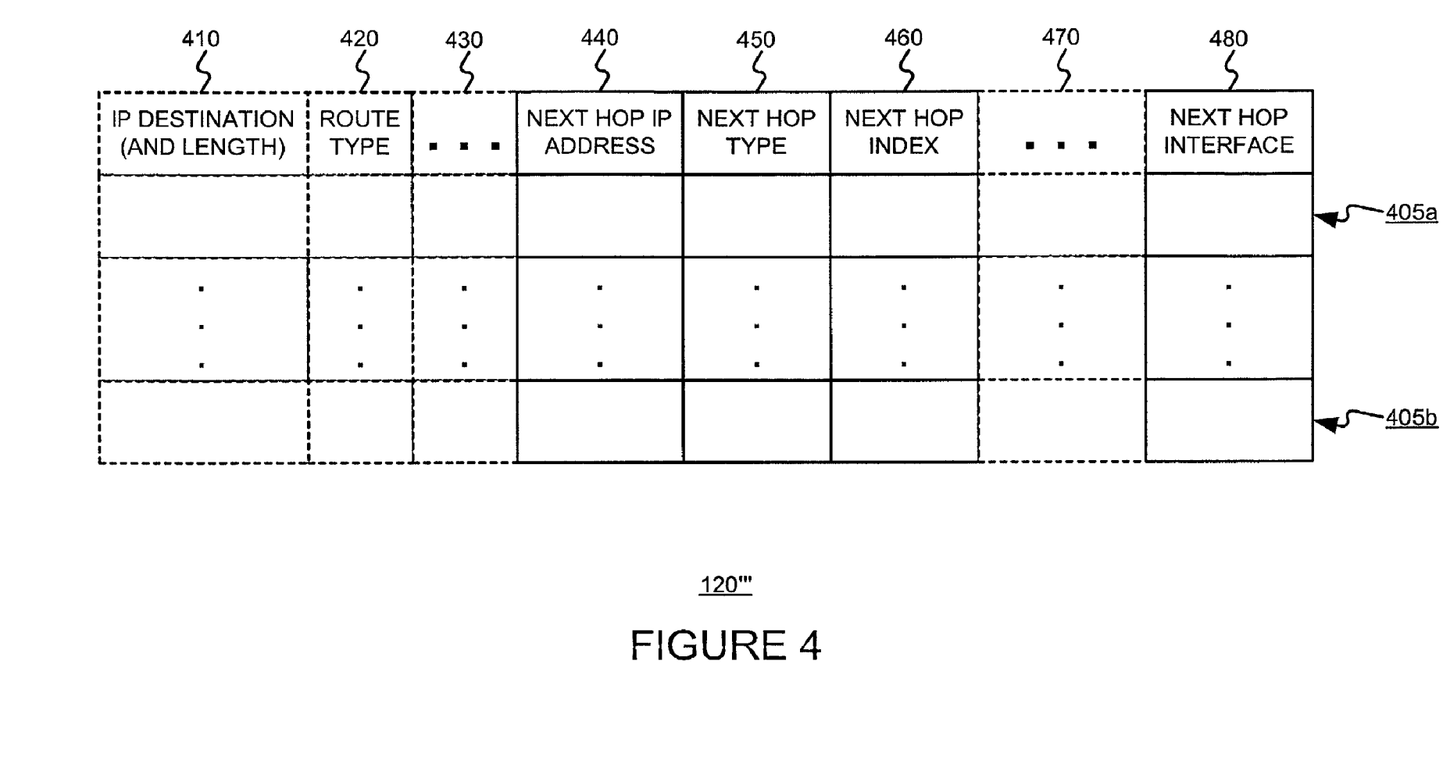
FIG. 4 is an exemplary data structure that may be used to store forwarding information and to associate a next hop index with a destination IP (layer 3) address and a next hop interface.
Figure 5:
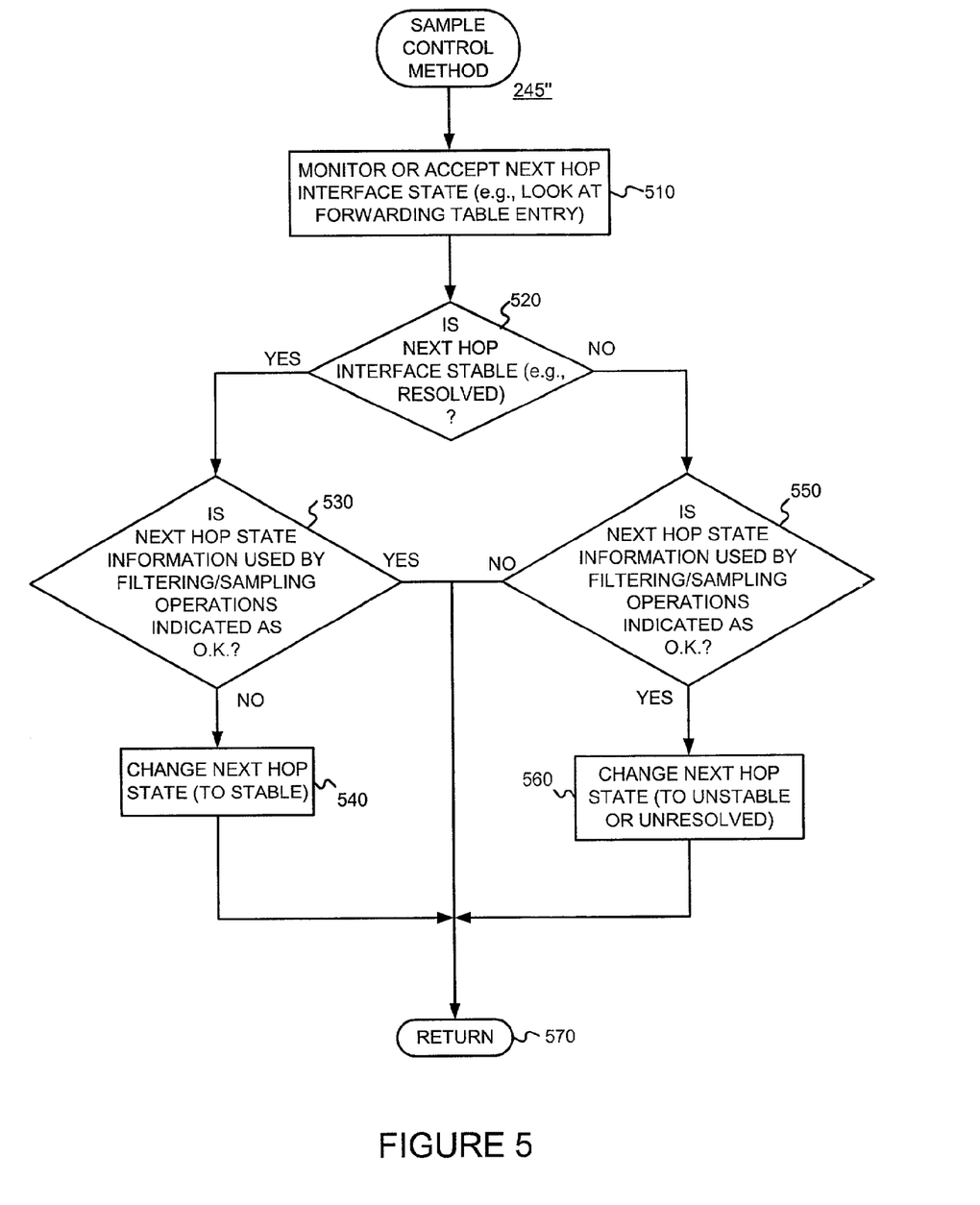
FIG. 5 is a flow diagram of an exemplary sample control method that may be used to effect a sample control operation.

FIG. 5 is a flow diagram of an exemplary sample control method 245'' that may be used to effect a sample control operation 245/245'. As indicated by block 510, a state of a next hop interface (associated with the next hop (interface) index 252/252') is monitored, or accepted. The next hop interface may be monitored as follows. Using the stored next hop (interface) index 252/252', a corresponding interface (e.g., having a logical part and a physical part) may be derived from the forwarding information 120'/120''. If applicable, a next hop IP address can be derived similarly. FIG. 4 is an exemplary data structure 120''' that may be used to store forwarding information 120'/120''. As shown, the exemplary data structure 120''' may include a number of records. Each of the records 405 may include a next hop IP address 440, a next hop type 450, a next hop index 460, and a next hop interface 480. In one embodiment, each of the records 405 may further include an IP (layer 3) destination 410, a route type 420, and a next hop reference 470. Clearly, this forwarding information can be used to map a next hop (interface) index 460 to a next hop IP address 440 and a next hop interface 480. This derived information can then be compared to the next hop information 230 previously obtained from configuration operation(s) 230 (e.g., as entered by a user). If the next hop interface (480) doesn't match that configured (e.g., entered by the user), and/or the next hop IP address (440) doesn't match that configured (e.g., entered by a user), then the next hop interface may be considered unstable.

Exemplary formats for each of the foregoing fields are now described. The IP destination field 410 may include the destination of the route, typically in the form of an IP address. The IP destination field 410 may also include a length (of the IP address) value. The length and IP destination together may define a network mask. Using such a network mask, a destination (layer 3) address of a packet may be associated with a closest matching IP destination 410. Permitting such inexact matching reduces the needed size of forwarding tables. The route type field 420 may be used to indicate how the route was placed into the forwarding table (e.g., a clone route for TCP or multicast, installed consequent to configuring an interface, a destination route for which the interface is down, a clone route for which the interface is down, an installed configured interface route for which the interface is down, a route to be ignored, a permanent route installed when the routing table is initialized, or a route installed by a routing protocol process or as a result of configuration). The next hop address field 440 may be used to define the next hop (e.g., layer 2 address) to the destination (e.g., layer 3 address). The next hop type field 450 may be used to convey information about the next hop (e.g., broadcast, discard—no ICMP unreachable message sent, hold while the next hop is waiting to be resolved, a local address on an interface, a regular multicast next hop, a wire multicast next hop, a multicast discard, a multicast group member, a receive, a discard, a resolving next hop, a unicast next hop, and a list of unicast next hops). The next hop index field 460 may be used to associate a number (typically shorter than the next hop IP address) with the next hop. Finally, the next hop interface field 480 may be used to identify an interface used to reach the next hop. The next hop interface field 480 may include a logical part and/or a physical part.

Referring back to FIGS. 2 and 3, the sample control operation(s) 245/245' can also generate the next hop (interface) index 252/252' based on the next hop information 230/230' from the configuration operation(s) 210/210'. For example, if a user entered a next hop interface (e.g., having a logical part and/or a physical part) via the configuration operation(s) 210/210', the logical part and/or physical part of the interface could be used to generate the next hop (interface) index 252/252' using interface information (table) 125/125'. In one embodiment, next hops must be unicast. A software check (e.g., during configuration) can be used to reduce the chance of accidental misconfiguration.

Referring back to FIG. 5, at conditional branch point 520, it is determined whether or not the next hop interface is stable (e.g., resolved). This determination may be based on the information in the forwarding table 120/120' and/or a comparison of information from the forwarding table and the configured next hop information 230/230'. If the next hop interface is stable, then, if the state (e.g., 254/254') of the next hop information (e.g., 252/252') used by the filtering/sampling operations 205/205' is not indicated as being stable, it is changed to indicate that the next hop interface is stable, as indicated by conditional branch point 530 and block 540. Referring back to decision branch point 520, if the next hop interface is not stable, then, if the state (e.g., 254/254') of the next hop information (e.g., 252/252') used by the filtering/sampling operations 205/205' is indicated as being stable, it is changed to indicate that the next hop interface is not stable, as indicated by conditional branch point 550 and block 560. As indicated, if the next hop state information 254/254' is in accord with the next hop interface state monitored or accepted in block 510, nothing is changed. The method 245'' is then left via RETURN node 570. The method 245'' may be periodically run, continuously run, or triggered upon the occurrence of an event (e.g., an update to the forwarding table) or upon one or more conditions being met.

Figure 6:
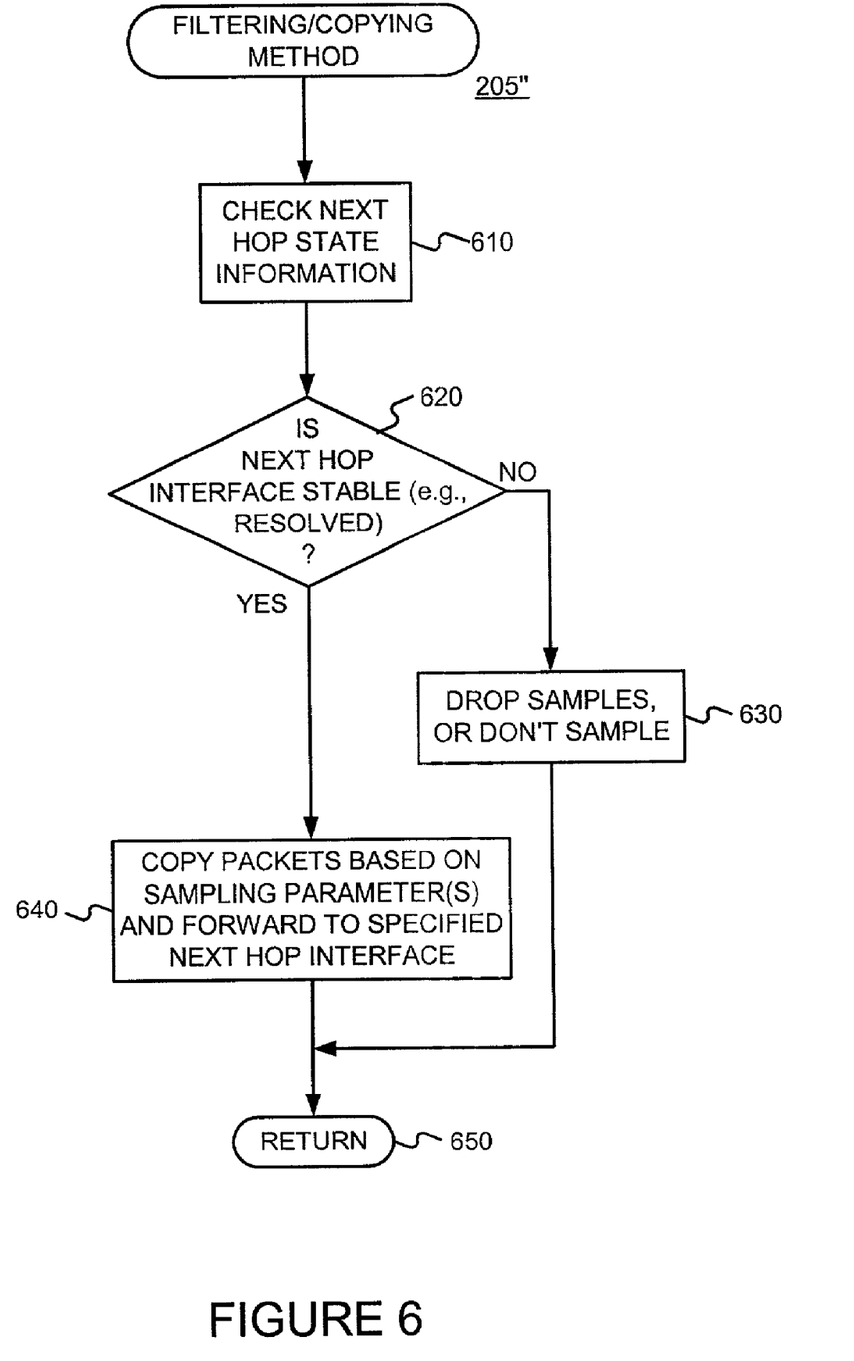
FIG. 6 is a flow diagram of an exemplary filtering/copying method that may be used to effect a filtering/copying operation.

FIG. 6 is a flow diagram of an exemplary filtering/copying method 205'' that may be used to effect a filtering/copying operation 205/205'. As indicated in block 610, the next hop state information (Recall, e.g., 254/254') is checked. As indicated by conditional branch point 620, it is determined whether or not the next hop interface is stable (e.g., resolved) based on the next hop state information. If the next hop is not stable, samples may be dropped (e.g., "blackholed" to a discard), and/or sampling may be discontinued, as indicated by block 630, and the method 630 is left via RETURN node 650. If, on the other hand, the next hop is stable, the packets are copied based on the sampling parameters (Recall, e.g., 220 and 220'.) and the copies are forwarded to the next hop interface specified by the next hop (interface) index (Recall, e.g., 252/252' and 460.), as indicated by block 640, and the method is left via RETURN node 650. The method 205'' may be periodically run, continuously run, or triggered upon the occurrence of an event, or upon one or more conditions being met.

In the exemplary embodiments described above, all samples derived at a given router were forwarded to a single specified next hop interface. Naturally, more than one next hop interface can be specified, and the states of such interfaces can be tracked.

§ 4.3.2.2 Exemplary Architectures

Figure 7:
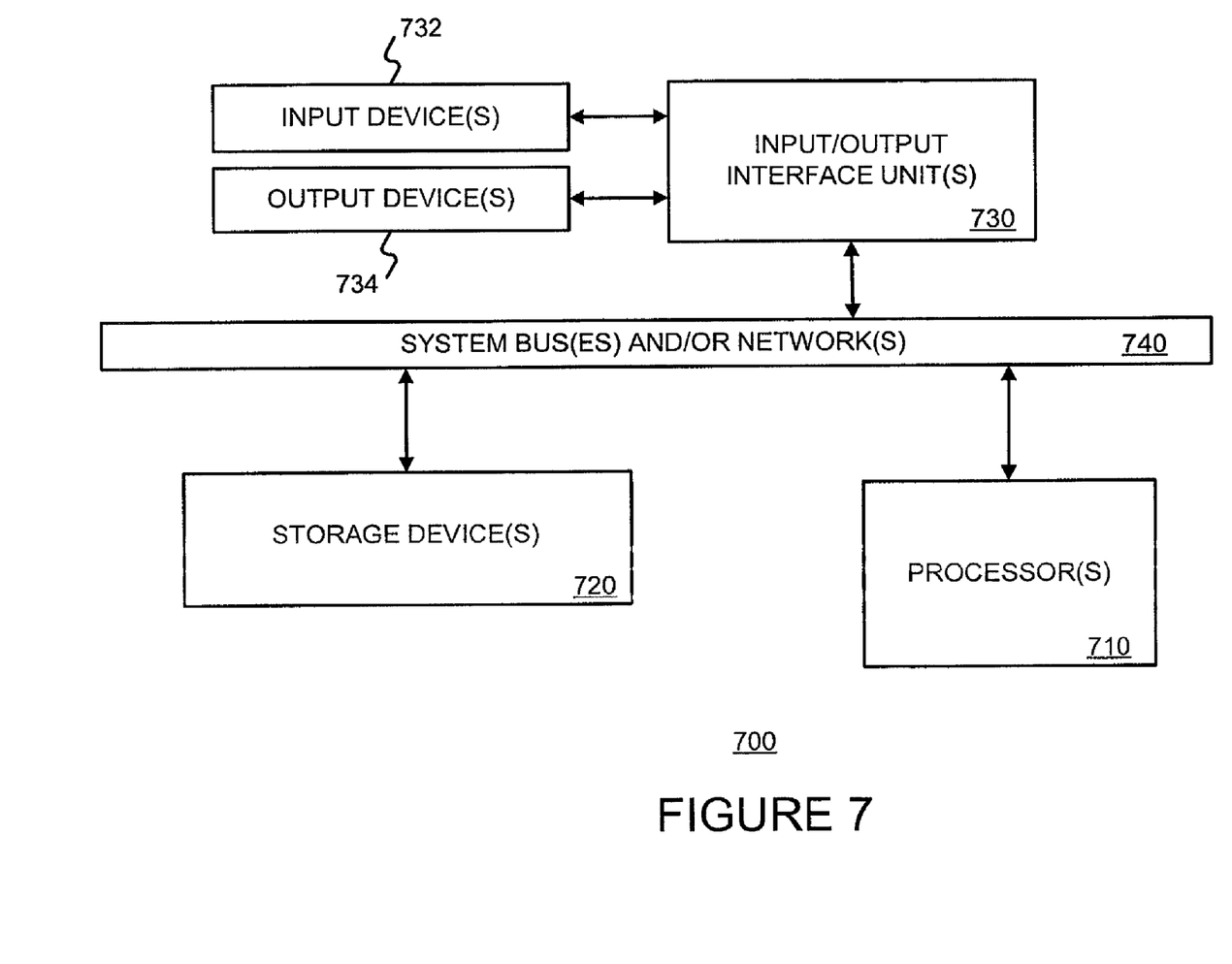
FIG. 7 is a block diagram of apparatus that may be used to practice at least some aspects of the invention.

FIG. 7 is high-level block diagram of a machine 700 that may effect one or more of the operations described above. The machine 700 basically includes a processor(s) 710, an input/output interface unit(s) 730, a storage device(s) 720, and a system bus(es) and/or a network(s) 740 for facilitating the communication of information among the coupled elements. An input device(s) 732 and an output device(s) 734 may be coupled with the input/output interface(s) 730. Operations of the present invention may be effected by the processor(s) 710 executing instructions. The instructions may be stored in the storage device(s) 720 and/or received via the input/output interface(s) 730. The instructions may be functionally grouped into processing modules.

The machine 700 may be a router for example. In an exemplary router, the processor(s) 710 may include a microprocessor, a network processor, and/or (e.g., custom) integrated circuit(s). In the exemplary router, the storage device(s) 720 may include ROM, RAM, SDRAM, SRAM, SSRAM, DRAM, flash drive(s), hard disk drive(s), and/or flash cards. At least some of these storage device(s) 720 may include program instructions defining an operating system, a protocol daemon, and/or other daemons. In a preferred embodiment, the methods of the present invention may be effected by a microprocessor executing stored program instructions. At least a portion of the machine executable instructions may be stored (temporarily or more permanently) on the storage device(s) 720 and/or may be received from an external source via an input interface unit 730. Finally, in the exemplary router, the input/output interface unit(s) 730, input device(s) 732 and output device(s) 734 may include interfaces to terminate communications links.

Figure 8:
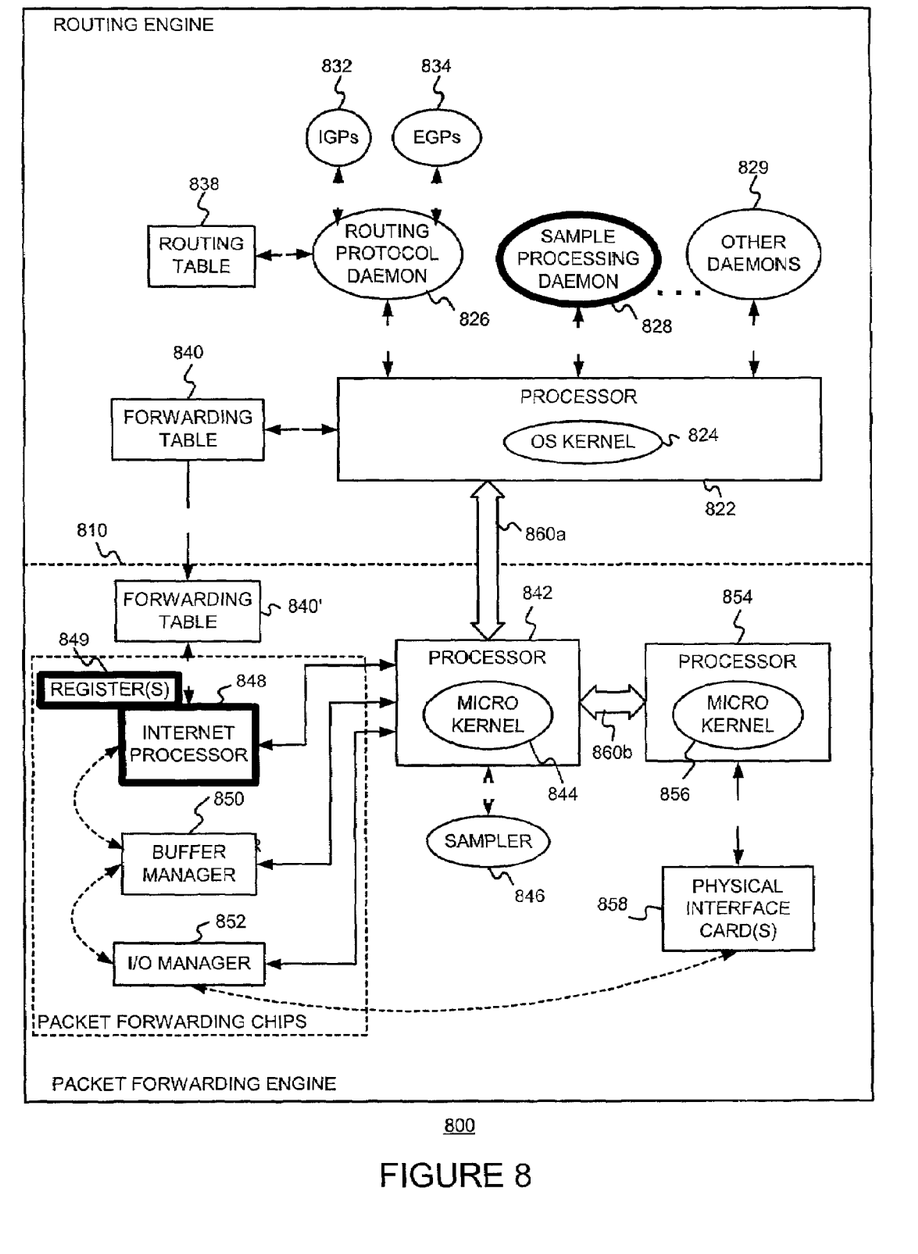
FIG. 8 is a diagram of a router that may be used, among other things, to practice at least some aspects of the invention.

In one exemplary embodiment, the operations of FIG. 2 or 3 may take place on a router having a hardware-intensive packet-forwarding part (also referred to as a "packet-forwarding engine") and a software-intensive routing part (also referred to as a "routing engine"). For example, FIG. 8 illustrates an exemplary router 800 having a routing engine (above dashed line 810) and a packet forwarding engine (below dashed line 810). The routing engine may include a processor 822 running an operating system kernel 824. The processor 822 may also run a number of daemons, such as a routing protocol daemon 826, a sample processing daemon 828, and other daemons 829. The routing protocol daemon 826 can support interior gateway protocols 832 and exterior gateway protocols 834 to generate a routing table 838. The processor 824 can generate a forwarding table 840 (Recall, e.g., FIG. 4.) based on the routing table 838. The sample processing daemon 828 may effect the sample control operations (Recall, e.g., 245 and 245'.).

In the packet forwarding engine part of the router, an instance 840' of the forwarding table 840 may be used to forward packets received and forwarded from physical interface card(s) ("PICs") 858. More specifically, packets received at a physical interface card 858 can be processed by an I/O manager card (e.g., an ASIC) 852, a buffer manager card e.g., an ASIC) 850, and an Internet processor (e.g., an ASIC) 848. Components 848, 850 and 852 may interact with a processor 842 supporting micro-kernel 844. The micro-kernel also interacts with sampler 846. A second processor 854 can support a second micro-kernel 856, which interacts with the physical interface card(s) 858. A local area network 860, such as an Ethernet, can support communications among the processors 822, 842 and 854.

Referring to FIGS. 2, 3 and 8, the packet forwarding engine of FIG. 8 can be responsible for the data forwarding operations 110' and 110" of FIGS. 2 and 3, respectively, where the forwarding table 840' is an exemplary implementation of the forwarding information 120' and 120" of FIGS. 2 and 3, respectively. The Internet processor 848 and the sampler 846 together define an exemplary implementation of the filtering/copying operations 205 and 205' of FIGS. 2 and 3, respectively. The next hop information 250/250' may be stored on one or more registers 849. Referring to both FIG. 4 and FIG. 8, the value in the next hop interface field 480 may have the following format:

physical < : channel > . logical

The physical part of the interface may be used to identify the physical device, which corresponds to a single physical network connector. The physical part may have the following format:

type - fpc/pic/port, where "type" is a media type (e.g., aggregated Ethernet, ATM, E1, E3, Fast Ethernet, Gigabit Ethernet, Generic Route Encapsulation ("GRE") tunnel, IP-over-IP encapsulation tunnel, loopback, multilink, SONET/SDH, T1, T3, etc.), "fpc" identifies a slot number on which a flexible PIC concentrator ("FPC") is accommodated, "pic" identifies a location on the FPC at which a physical interface card ("PIC") is installed, and "port" identifies a port on the PIC which terminates the link. The "channel" part of the exemplary interface name is optional and may be used to identify a channel of a channelized interface. Finally, the "logical" part of the exemplary interface name simply corresponds to a logical unit number (e.g., in the range 0 through 65535).

In one embodiment, the packet forwarding engine may have a separate next hop (interface) index for each sampling class. Then, if a next hop is deleted, it is determined whether or not it was the next hop (interface) index for each of the sampling classes. If so, the sampling for the given class may be stopped until a new next hop index is stored.

In one embodiment a (e.g., hardware) counter may be provided to count the number of bytes and/or packets sampled. Separate counters may be provided if more than one class of packets is sampled. Such counts may be useful for debugging and performance monitoring.

Naturally, the operations of the present invention may be effected on systems other than routers, or on routers with different architectures. Such other systems may employ different hardware and/or software.

§ 4.4 Examples of Operations in an Exemplary Embodiment

An example of operations of the present invention in the exemplary embodiment of FIG. 8 is now described. Initially, a user may enter sampling parameters (Recall, e.g., 220/220'.) and next hop information (Recall, e.g., 230/230'.) via a configuration operation (e.g., one of the "other" daemons 829). Based on this information, the sample processing daemon 828 may define a next hop (interface) index (Recall, e.g., 252/252') (e.g., from interface information 125/125') and next hop state information (254/254'), (e.g., from the forwarding table 840 (Recall, e.g., FIG. 4.) and/or the configured next hop information 230/230'). The sample processing daemon 828 may pass this information, via the OS kernel 824, LAN 860*a*, and micro-kernel 844, to a register or registers 849 used by one of the ASICs (e.g., the Internet Processor 848). At this point, the router 800 is configured to copy packets, based on the sampling parameters, and forward such copies to a logical interface defined as the next hop interface, presuming that the next hop interface is stable.

Now assume that the next hop interface becomes unstable (e.g., due to an address resolution protocol ("ARP"), update a link going down, etc.). That instability may be indicated to the routing protocol daemon 826 via a PIC 858, micro-kernel 856, LAN 860*b*, micro-kernel 844, LAN 860*a*, and kernel 824. The routing protocol daemon 826 will then make the appropriate changes to the routing table 838. For example, a next hop (interface) index can be reassigned to different next hop interface and/or a different next hop address. Consequently the forwarding table 840 is changed. Discovering this change (e.g., by comparing the information from the forwarding table 120'/120" with the next hop information 230/230'), the sample processing daemon 828 may then appropriately update the register 849 used by the ASIC (e.g., the Internet Processor 848) so that sampling is suppressed and/or samples are dropped. Changes to a next hop interface taking place in the kernel may be tracked by listening to a routing socket for asynchronous messages from the kernel.

§ 4.5 CONCLUSIONS

As can be appreciated from the foregoing disclosure, and the operating example set forth in § 4.4, the present invention can specify a next hop interface for samples. The present invention can further suppress sampling and/or drop samples is the specified next hop interface becomes unstable. Using hardware (e.g. registers) to hold a next hop interface index and a next hop interface state, sampling can be done at high speeds (e.g., line rate). By managing the contents of these hardware registers using software, flexible and intelligent control of samples is achieved.

What is claimed is:

1. A method for controlling sampling of addressed data, the method comprising:
   a) determining a state of next hop information defining a destination for samples of addressed data;
   b) if it is determined that the state of the next hop information is stable, then
      i) generating samples from the addressed data, and
      ii) forwarding the samples based on the next hop information; and
   c) if it is determined that the state of the next hop information is not stable, then not forwarding samples,
   wherein the act of not forwarding samples includes dropping samples generated.

2. A method for controlling sampling of addressed data, the method comprising:
   a) determining a state of next hop information defining a destination for samples of addressed data;
   b) if it is determined that the state of the next hop information is stable, then
      i) generating samples from the addressed data, and
      ii) forwarding the samples based on the next hop information; and
   c) if it is determined that the state of the next hop information is not stable, then not forwarding samples,
   wherein the next hop information (A) includes an index or name associated with an interface, (B) is associated with an interface, or (C) is associated with a next hop destination address.

3. The method of claim 2 wherein a link terminated by the interface defines a point-to-point connection with a sample destination device.

4. The method of claim 2 wherein a link terminated by the interface defines a point-to-point connection with a sample destination device.

5. A method for controlling sampling of addressed data, the method comprising:
   a) determining a state of next hop information defining a destination for samples of addressed data;
   b) if it is determined that the state of the next hop information is stable, then
      i) generating samples from the addressed data, and
      ii) forwarding the samples based on the next hop information; and
   c) if it is determined that the state of the next hop information is not stable, then not forwarding samples,
   wherein the act of determining a state of next hop information defining a destination for samples of addressed data includes reading a state flag.

6. The method of claim 5 wherein the state flag is stored in a hardware register.

7. A method for controlling sampling of addressed data, the method comprising:
   a) determining a state of next hop information defining a destination for samples of addressed data;
   b) if it is determined that the state of the next hop information is stable, then
      i) generating samples from the addressed data, and
      ii) forwarding the samples based on the next hop information; and
   c) if it is determined that the state of the next hop information is not stable, then not forwarding samples,
   wherein the act of generating samples from the addressed data is performed based on parameters.

8. The method of claim 7 wherein the parameters are user configured.

9. The method of claim 8 wherein the parameters include at least two parameters selected from a group of parameters consisting of (a) sampling rate, (b) class to be sampled, (c) protocol to be sampled, and (d) run length.

10. A method for controlling sampling of addressed data, the method comprising:
    a) determining a state of next hop information defining a destination for samples of addressed data;
    b) if it is determined that the state of the next hop information is stable, then
       i) generating samples from the addressed data, and
       ii) forwarding the samples based on the next hop information;
    c) if it is determined that the state of the next hop information is not stable, then not forwarding samples; and
    d) counting some parameter of samples forwarded.

11. A method for maintaining information used to control sampling of addressed data, the method comprising:
    a) determining a state of next hop information defining a destination for samples of addressed data; and
    b) if it is determined that the state of the next hop information is unstable, then ensuring that information used to control the sampling of addressed data indicates that the next hop information is unstable, wherein the information used to control the sampling of addressed data includes next hop information and next hop state information, and wherein the next hop information includes an index or name associated with an interface.

12. The method of claim 11 wherein a link terminated by the interface defines a point-to-point connection with a sample destination device.

13. A method for maintaining information used to control sampling of addressed data, the method comprising:
   a) determining a state of next hop information defining a destination for samples of addressed data; and
   b) if it is determined that the state of the next hop information is unstable, then ensuring that information used to control the sampling of addressed data indicates that the next hop information is unstable,
      wherein the information used to control the sampling of addressed data includes next hop information and next hop state information, and
wherein the next hop information (A) is associated with an interface, or (B) includes a next hop destination address.

14. The method of claim 13 wherein a link terminated by the interface defines a point-to-point connection with a sample destination device.

15. A method for maintaining information used to control sampling of addressed data, the method comprising:
   a) accepting configured next hop information;
   b) determining next hop interface information from the accepted configured next hop information;
   c) determining a state of the next hop interface information; and
   d) storing the determined next hop interface information and the state of the next hop interface information,
wherein the next hop interface information is an index or name associated with an interface or a logical interface of a router.

16. A method for maintaining information used to control sampling of addressed data, the method comprising:
   a) accepting configured next hop information;
   b) determining next hop interface information from the accepted configured next hop information;
   c) determining a state of the next hop interface information; and
   d) storing the determined next hop interface information and the state of the next hop interface information,
wherein the act of determining next hop interface information from the accepted configured next hop information uses information in an interface list of a router.

17. A method for maintaining information used to control sampling of addressed data, the method comprising:
   a) accepting configured next hop information;
   b) determining next hop interface information from the accepted configured next hop information;
   c) determining a state of the next hop interface information; and
   d) storing the determined next hop interface information and the state of the next hop interface information,
wherein the act of determining a state of the next hop interface information uses information in a forwarding table of a router.

18. A method for maintaining information used to control sampling of addressed data, the method comprising:
   a) accepting configured next hop information;
   b) determining next hop interface information from the accepted configured next hop information;
   c) determining a state of the next hop interface information; and
   d) storing the determined next hop interface information and the state of the next hop interface information,
wherein the act of storing the determined next hop interface information and the state of the next hop interface information includes writing the next hop interface information and the state of the next hop interface information into at least one hardware register.

19. A computer-readable medium having computer-readable data structures stored thereon, the computer-readable data structures comprising:
   a) at least one parameter for controlling the sampling of addressed data;
   b) information identifying a next hop destination of samples of addressed data;
   c) information identifying a state of the information identifying a next hop destination of samples of addressed data; and
   d) a forwarding table,
      wherein the forwarding table includes a plurality of entries, each of the plurality of entries including a next hop index and a next hop interface.

20. The computer-readable medium of claim 19 wherein each of the plurality of entries of the forwarding table further includes a next hop address.

* * * * *